(12) United States Patent
Sone et al.

(10) Patent No.: US 6,642,314 B2
(45) Date of Patent: Nov. 4, 2003

(54) RUBBER COMPOSITION AND SOLID GOLF BALL

(75) Inventors: Takuo Sone, Mie (JP); Toshihiro Tadaki, Mie (JP)

(73) Assignee: JSR Corporation, Tokyo (JP)

( * ) Notice: Subject to any disclaimer, the term of this patent is extended or adjusted under 35 U.S.C. 154(b) by 67 days.

(21) Appl. No.: 10/032,068

(22) Filed: Dec. 31, 2001

(65) Prior Publication Data

US 2002/0137848 A1 Sep. 26, 2002

(30) Foreign Application Priority Data

Jan. 24, 2001 (JP) ........................................ 2001-015317

(51) Int. Cl.[7] .................................................. C08F 8/00
(52) U.S. Cl. ........................ 525/232; 525/221; 525/240; 525/241; 524/401; 524/408; 524/425; 524/433; 524/437
(58) Field of Search ................................ 525/192, 191, 525/240, 241, 221, 232; 524/401, 408, 425, 437, 433

(56) References Cited

PUBLICATIONS

Patent Abstract of Japan, JP 58–225138, Dec. 27, 1983 (with corr. JP 03–059931).
Patent Abstract of Japan, JP 03–059931, Mar. 14, 1991.
Patent Abstract of Japan, JP 62–089750, Apr. 24, 1987 (with corr. JP 6–80123).
Patent Abstract of Japan, JP 06–080123, Mar. 22, 1994.
Patent Abstract of Japan, JP 2–268778, Nov. 2, 1990.
Patent Abstract of Japan, JP 06–079018, Mar. 22, 1994.
Patent Abstract of Japan, JP 11–319148, Nov. 24, 1999.
Patent Abstract of Japan, JP 11–164912, Jun. 22, 1999.
Patent Abstract of Japan, JP 07–268132, Oct. 17, 1995.
Patent Abstract of Japan, JP 2000–042142, Feb. 15, 2000.

*Primary Examiner*—Nathan M. Nutter
*Assistant Examiner*—Thao Tran
(74) *Attorney, Agent, or Firm*—Oblon, Spivak, McClelland, Maier & Neustadt, P.C.

(57) ABSTRACT

Disclosed is a rubber composition containing (a) 50 parts to 100 parts by weight of polybutadiene rubber having a 1,4-cis bond content of 80 mol % to 100 mol % and a 1,2-vinyl bond content of 0 mol % to 2 mol %, which is modified with an alkoxysilyl group-containing compound, (b) 0 part to 50 parts by weight of diene rubber other than the above-mentioned component (a) (wherein the total amount of component (a) and component (b) is 100 parts by weight), (c) 10 parts to 50 parts by weight of a crosslinkable monomer, (d) 5 parts to 80 parts by weight of an inorganic filler and (e) 0.1 part to 10 parts by weight of an organic peroxide, and a solid golf ball improved in flight, durability and the feeling of ball hitting can be produced from the rubber composition.

20 Claims, 1 Drawing Sheet

RUBBER COMPOSITION AND SOLID GOLF BALL

FIELD OF THE INVENTION

The present invention relates to a rubber composition and a solid golf ball. More particularly, the present invention relates to a rubber composition giving a solid golf ball good in the feeling of ball hitting, long in flight (carry) and excellent in durability, and a solid golf ball obtained therefrom.

BACKGROUND OF THE INVENTION

Solid golf balls include one-piece solid golf balls integrally molded from crosslinked products of rubber compositions, and multiple-pieces solid golf balls such as two-pieces solid golf balls, three-pieces solid golf balls and four-pieces solid golf balls in which solid cores having one- to three-layers structure composed of crosslinked products of hard rubber compositions are coated with covers.

Of these solid golf balls, the multiple-pieces solid golf balls are particularly excellent in flight, so that in recent years, they have mainly been used as golf balls for playing rounds of golf. However, the multiple-pieces solid golf balls have the disadvantage that the feeling of ball hitting is hard, compared with conventional thread-wound structure golf balls. Then, it has been attempted that the cores are softened, and moreover, portions nearer to the centers of the cores are more softened to increase the deformation of the cores on hitting, thereby improving the feeling of ball hitting of the multiple-pieces solid golf balls. However, the softening of the cores deteriorates durability and resilience (carry). It has been therefore desired that multiple-pieces solid golf balls good in the feeling of ball hitting, long in flight and excellent in durability appear.

On the other hand, the one-piece solid golf balls have mainly been used as golf balls for training fields, and are liable to be cracked or chipped by repeated hitting. Accordingly, excellent durability is required so as to prevent the balls from being cracked or chipped as far as possible. Further, golf training players require that the feeling of ball hitting is also good.

Rubber compositions containing polybutadiene having a 1,4-cis bond content of 80 mol % or more, which is synthesized using a nickel catalyst or a cobalt catalyst, have hitherto suitably been used for cores of the multiple-pieces solid golf balls and core portions (solid centers) of the one-piece solid golf balls, because of their high resilience and durability. It is further known that polybutadiene synthesized using a rare earth element catalyst can be used for a similar purpose.

For example, Examined Japanese Patent Publication (Hei) 3-59931, Examined Japanese Patent Publication (Hei) 6-80123, Japanese Patent No. 2678240, Japanese Patent Laid-open Publication (Hei) 6-79018 and Japanese Patent Laid-open Publication (Hei) 11-319148 disclose that rubber compositions containing polybutadiene synthesized using rare earth element catalysts are suitable for the golf ball purpose. However, the resilience and durability of the resulting golf balls are insufficient. Further, the production workability thereof is also insufficient.

Japanese Patent Laid-open Publication (Hei) 7-268132 discloses a golf ball composed of a rubber composition mainly containing polybutadiene synthesized using a rare earth element catalyst modified with a tin compound. However, the ratio (Mw/Mn) of weight average molecular weight (Mw) to number average molecular weight (Mn) is high, so that the resilience and durability are insufficient.

Japanese Patent Laid-open Publication (Hei) 11-164912 discloses the use of modified polybutadiene rubber having a 1,4-cis bond content of 80 mol % or more, a 1,2-vinyl bond content of 2 mol % or less and a low ratio (Mw/Mn) of weight average molecular weight (Mw) to number average molecular weight (Mn) of 3.5 or less. However, this is insufficient in production workability, and there is still room for improvement in resilience and durability.

SUMMARY OF THE INVENTION

It is therefore an object of the present invention to provide a rubber composition which can give a solid golf ball improved in flight, durability and the feeling of ball hitting.

Another object of the present invention is to provide a solid golf ball improved in flight, durability and the feeling of ball hitting.

According to the present invention, there are provided the following rubber composition and solid golf ball, thereby achieving the above-mentioned objects of the present invention.

(1) A rubber composition containing (a) 50 parts to 100 parts by weight of polybutadiene rubber having a 1,4-cis bond content of 80 mol % to 100 mol % and a 1,2-vinyl bond content of 0 mol % to 2 mol %, which is modified with an alkoxysilyl group-containing compound, (b) 0 part to 50 parts by weight of diene rubber other than the above-mentioned component (a) (wherein the total amount of component (a) and component (b) is 100 parts by weight), (c) 10 parts to 50 parts by weight of a crosslinkable monomer, (d) 5 parts to 80 parts by weight of an inorganic filler and (e) 0.1 part to 10 parts by weight of an organic peroxide;

(2) The rubber composition described in the above (1), wherein modified polybutadiene rubber (a) has a ratio (Mw/Mn) of weight average molecular weight (Mw) to number average molecular weight (Mn) of 1.0 to 3.5;

(3) The rubber composition described in the above (1) or (2), wherein modified polybutadiene rubber (a) has a Mooney viscosity ($ML_{1+4}$ (100° C.)) of 30 to 100;

(4) The rubber composition described in any one of the above (1) to (3), wherein component (a) is modified polybutadiene rubber obtained by polymerizing butadiene using a rare earth element catalyst, and subsequently allowing the alkoxysilyl group-containing compound to react with the resulting polybutadiene;

(5) The rubber composition described in the above (4), wherein the rare earth element catalyst is a neodymium catalyst;

(6) The rubber composition described in any one of the above (1) to (5), wherein the alkoxysilyl group-containing compound is an alkoxysilane compound having at least one epoxy group or isocyanate group in a molecule thereof;

(7) The rubber composition described in any one of the above (1) to (6), wherein the alkoxysilyl group-containing compound is 3-glycidyloxypropyltrimethoxysilane; and (8) A solid golf ball in which a part or the whole of a rubber substance constituting the solid golf ball is obtained by crosslinking and molding the rubber composition described in any one of the above (1) to (7).

DESCRIPTION OF THE PREFERRED EMBODIMENTS

Figure 1:
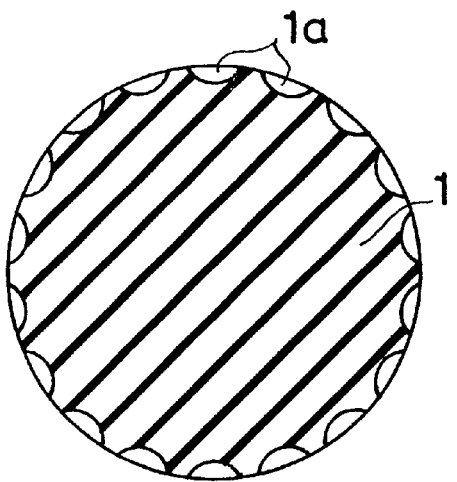
FIG. 1 is a schematic cross sectional view showing an example of one-piece solid golf balls.

First, component (a) of the rubber composition of the present invention will be described.

As described above, the modified polybutadiene rubber modified with the alkoxysilyl group-containing compound, component (a), has a 1,4-cis bond content (cis content) of 80 mol % to 100 mol %, preferably 90 mol % to 100 mol %, and a 1,2-vinyl bond content (vinyl content) of 0 mol % to 2 mol %, preferably 0 mol % to 1.5 mol %. As to component (a), the ratio (Mw/Mn) of weight average molecular weight (Mw) to number average molecular weight (Mn) is preferably from 1.0 to 3.5, and more preferably from 1.0 to 3.3; the Mooney viscosity ($ML_{1+4}$ (100° C.)) is preferably from 30 to 100, and more preferably from 50 to 90; and the viscosity of a 5-wt % toluene solution (SV: solvent viscosity) is preferably from 150 to 1,500 cPs, and more preferably from 200 to 1,500 cPs.

A 1,4-cis bond content (cis content) of modified polybutadiene rubber (a) of less than 80 mol % results in inferior resilience. Further, a 1,2-vinyl bond content (vinyl content) exceeding 2 mol % also results in inferior resilience.

Still further, an Mw/Mn of component (a) exceeding 3.5 results in inferior resilience and durability. A Mooney viscosity ($ML_{1+4}$ (100° C.)) of component (a) of less than 30 results in inferior resilience and durability, whereas exceeding 100 results in inferior production workability. Furthermore, when the viscosity of a 5-wt % solution of component (a) in toluene at 25° C. (SV) is less than 150 cPs, the resilience is deteriorated.

The modification of polybutadiene with the alkoxysilyl group-containing compound is conducted, for example, by adding the alkoxysilyl group-containing compound to a polybutadiene rubber solution after polymerization to allow the compound to react with polybutadiene.

The above-mentioned modified polybutadiene rubber is preferably produced by polymerizing butadiene in the presence of a rare earth element catalyst showing quasi-living polymerizability, and subsequently allowing the alkoxysilyl group-containing compound to react with the resulting polybutadiene.

The rubber composition of the present invention contains polybutadiene having mostly 1,4-cis bonds, as a main rubber component, moreover, narrow in molecular weight distribution and high in solution viscosity, and the polybutadiene is modified with the alkoxysilyl group-containing compound, thereby obtaining the rubber composition excellent in production workability. Further, the solid golf ball having a rubber substance constituted by a crosslinked molded article of the rubber composition of the present invention shows long flight, and is excellent in the feeling of ball hitting and durability.

As the rare earth element catalyst used in the polymerization of butadiene, a known catalyst can be used.

For example, there can be used lanthanum series rare earth element compounds, organic aluminum compounds, alumoxane, halogen-containing compounds and a combination with Lewis bases in option.

The lanthanum series rare earth element compounds include halides of metals of atomic numbers 57 to 71, carboxylates, alcoholates, thioalcoholates and amides.

Further, as the organic aluminum compounds, there are used compounds represented by $AlR^1R^2R^3$ (wherein $R^1$, $R^2$ and $R^3$, which may be the same or different, each represent hydrogen or hydrocarbon residues each having 1 to 8 carbon atoms). The alumoxanes are compounds having a structure represented by the following formula (I) or (II). Aggregates of the alumoxanes described in *Fine Chemical*, 23 (9), 5 (1994), *J. Am. Chem. Soc.*, 115, 4971 (1993), and *J. Am. Chem. Soc.*, 117, 6465 (1995) may be used.

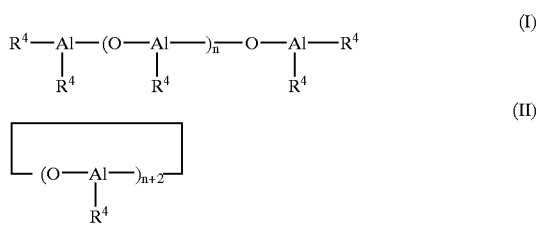

wherein $R^4$ is a hydrocarbon group having 1 to 20 carbon atoms, and n is an integer of 2 or more.

As the halogen-containing compounds, there are used aluminum halides represented by $AlX_nR^5_{3-n}$ (wherein X is a halogen atom, $R^5$ is a hydrocarbon residue having 1 to 20 carbon atoms such as an alkyl group, an aryl group or an aralkyl group, and n is 1, 1.5, 2 or 3); strontium halides such as $Me_3SrCl$, $Me_2SrCl_2$, $MeSrHCl_2$ and $MeSrCl_3$; and metal halides such as silicon tetrachloride, tin tetrachloride and titanium tetrachloride. The Lewis bases are used for complexing the lanthanum series rare earth element compounds. For example, acetylacetone and ketone alcohols are suitably used. Above all, neodymium catalysts in which neodymium compounds are used as the lanthanum series rare earth element compounds are preferably used, because polybutadiene rubber high in the 1,4-cis bond content and low in the 1,2-vinyl bond content is obtained with excellent polymerization activity.

Specific examples of these rare earth element catalysts are described in Examined Japanese Patent Publication (Sho) 62-1404, Examined Japanese Patent Publication (Sho) 63-64444, and Japanese Patent Laid-open Publication (Hei) 11-35633, Japanese Patent Laid-open Publication (Hei) 10-306113 and Japanese Patent Laid-open Publication 2000-34320 filed by the present applicant, and can be used.

When butadiene is polymerized in the presence of the rare earth element catalyst using the lanthanum series rare earth element compound (La type compound), the molar ratio of butadiene to the La type compound is preferably from 1,000 to 2,000,000, and particularly preferably from 5,000 to 1,000,000, and the molar ratio of $AlR^1R^2R^3$ to the La type compound is preferably from 1 to 1,000, and particularly preferably from 3 to 500, for obtaining a cis content and a Mw/Mn ratio within the above-mentioned ranges. Further, the molar ratio of the halogen compound to the La type compound is preferably from 0.1 to 30, and particularly preferably from 0.2 to 15. The molar ratio of the Lewis base to the La type compound is preferably from 0 to 30, and particularly preferably from 1 to 10. In polymerization, a solvent may be used, or bulk polymerization or gas phase polymerization using no solvent may be employed. The polymerization temperature is usually from −30° C. to 150° C., and preferably from 10° C. to 100° C.

The modified polybutadiene rubber is obtained by allowing the alkoxysilyl group-containing compound (terminal modifier) to react with an active terminal of the polymer, following after the above polymerization.

As the alkoxysilyl group-containing compound, there is suitably used an alkoxysilane compound having at least one epoxy group or isocyanate group in its molecule. Specific examples thereof include epoxy group-containing alkoxysilane compounds such as 3-glycidyloxypropyltrimethoxysilane, 3-glycidyloxypropyltriethoxysilane, (3-glycidyloxypropyl)methyldimethoxysilane, (3-glycidyloxypropyl)methyldiethoxysilane, β-(3,4-epoxycyclohexyl)trimethoxysilane, β-(3,4-epoxycyclohexyl)triethoxysilane, β-(3,4-epoxycyclohexyl)methyldimethoxysilane, β-(3,4-epoxycyclohexyl)ethyldimethoxysilane, a condensate of 3-glycidyloxypropyltrimethoxysilane and a condensate of (3-glycidyloxypropyl)methyldimethoxysilane; and isocyanate group-containing alkoxysilane compounds such as 3-isocyanatepropyltrimethoxysilane, 3-isocyanatepropyltriethoxysilane, (3-isocyanatepropyl)methyldimethoxysilane, (3-isocyanatepropyl)methyldiethoxysilane, a condensate of 3-isocyanatepropyltrimethoxysilane and a condensate of (3-isocyanatepropyl)methyldimethoxysilane.

Further, when the above-mentioned alkoxysilyl group-containing compound is allowed to react with the active terminal of the polymer, a Lewis acid can also be added for accelerating the reaction. The Lewis acid accelerates the coupling reaction as a catalyst thereby improving the cold flow of the modified polymer, resulting in the improved storage stability thereof.

Specific examples of the Lewis acids include dialkyltin dialkylmaleates, dialkyltin dicarboxylates and aluminum trialkoxides.

As reaction methods of modification with the above-mentioned terminal modifiers, there can be used known methods per se. for example, a method described in Japanese Patent Laid-open Publication (Hei) 11-35633 filed by the present applicant and a method described in Japanese Patent Laid-open Publication (Hei) 7-268132 can be employed.

Then, the diene rubber other than the above-mentioned component (a), component (b), will be illustrated below.

Component (b) is not indispensable to the rubber composition of the present invention, and a component optionally added within the range not inhibiting the achievement of the objects of the present invention. Specific examples of components (b) include unmodified or modified polybutadiene rubber having a cis content of less than 80 mol % or an Mw/Mn ratio exceeding 3.5, styrenebutadiene rubber (SBR), natural rubber, synthetic polyisoprene rubber and ethylene-propylene-diene rubber (EPDM).

These can be used either alone or as a combination of two or more of them.

Then, the crosslinkable monomer, component (c), will be described below.

Crosslinkable monomer (c) is polymerized by radicals produced by decomposition of organic peroxides described below and functioning as radical initiators, and acts so as to accelerate the crosslinking of component (a) and component (b).

The crosslinkable monomers added to the rubber compositions of the present invention are preferably monovalent or divalent metal salts of α,β-ethylenic unsaturated carboxylic acids, and specific examples thereof include the following:

(i) Acrylic acid, methacrylic acid, itaconic acid, maleic acid, fumalic acid, crotonic acid, sorbic acid, tiglic acid, cinnamic acid and aconitic acid (these can be used either alone or as a combination of two or more of them); and (ii) Zn, Ca, Mg, Ba and Na salts of the unsaturated acids described in the above (i) (these can be used either alone or as a combination of two or more of them).

The unsaturated acids of the above (i) and the metal salts of the above (ii) can be used in combination. The above-mentioned metal salts of the α,β-ethylenic unsaturated carboxylic acids may be either mixed as such with base rubber by conventional methods, or formed by adding the α,β-ethylenic unsaturated carboxylic acids such as acrylic acid and methacrylic acid to the rubber compositions with which metal oxides such as zinc oxide have previously been mixed by kneading them, and kneading the α,β-ethylenic unsaturated carboxylic acids and the rubber compositions together to allow the α,β-ethylenic unsaturated carboxylic acids to react with the metal oxides in the rubber compositions. The crosslinkable monomers (c) can be used either alone or as a combination of two or more of them.

The inorganic filler, component (d) will be illustrated below.

Inorganic filler (d) can reinforce the crosslinked rubber to improve the strength, and adjust the weight of the solid golf ball by the amount thereof added.

Specifically, the inorganic fillers include zinc oxide, barium sulfate, silica, alumina, aluminum sulfate, calcium carbonate, aluminum silicate and magnesium silicate. Zinc oxide, barium sulfate and silica are preferably used among others. These inorganic fillers can be used either alone or as a combination of two or more of them.

Then, the organic peroxide, component (e), will be illustrated below.

Organic peroxide (e) added to the rubber composition of the present invention acts as an initiator for crosslinking reaction, graft reaction and polymerization reaction of rubber components comprising component (a) and component (b), and crosslinkable monomer (c).

Suitable specific examples of the organic peroxides include dicumyl peroxide, 1,1-bis(t-butylperoxy)-3,3,5-trimethylcyclohexane, 2,5-dimethyl-2,5-di-(t-butylper-oxy)hexane and 1,3-bis(t-butylperoxyisopropyl)benzene.

The amount ratio of component (a), component (b), crosslinkable monomer (c), inorganic filler (d) and organic peroxide (e) is as follows.

The amount of modified polybutadiene rubber (a) is from 50 parts to 100 parts by weight, and preferably from 60 parts to 100 parts by weight, and the amount of diene rubber (b) other than the above-mentioned component (a) is from 0 part to 50 parts by weight, and preferably from 0 part to 40 parts by weight (wherein the total amount of component (a) and component (b) is 100 parts by weight). In components (a) and (b), when the amount of component (a) added is less than 50 parts by weight, the resilience of the solid golf ball is insufficient, which unfavorably causes no increase in initial velocity of the ball and no prolongation in flight (carry).

The amount of crosslinkable monomer (c) added is from 10 parts to 50 parts by weight, and preferably from 10 parts to 40 parts by weight, based on 100 parts by weight of the total amount of components (a) and (b). Less than 10 parts by weight results in insufficient resilience of the solid golf ball, which causes a decrease in initial velocity of the golf ball and a decrease in flight, whereas exceeding 50 parts by weight results in so hard a golf ball that the feeling of ball hitting is deteriorated.

The amount of inorganic filler (d) added is from 5 parts to 80 parts by weight, and preferably from 5 parts to 70 parts by weight, based on 100 parts by weight of the total amount of components (a) and (b). Less than 5 parts by weight results in too light a solid golf ball obtained, whereas exceeding 80 parts by weight results in too heavy a solid golf ball obtained.

The amount of organic peroxide (e) added is from 0.1 part to 10 parts by weight, and preferably from 0.2 part to 5 parts by weight, based on 100 parts by weight of the total amount of components (a) and (b). Less than 0.1 part by weight results in too soft a golf ball, which causes deterioration in the resilience to decrease flight (carry), whereas exceeding 10 parts by weight results in too hard a golf ball, which causes deterioration in the feeling of ball hitting.

By allowing the above-mentioned respective components to be contained in amounts within the above-mentioned ranges, the solid golf ball excellent in flight, durability and the feeling of ball hitting is obtained from the rubber composition of the present invention.

The rubber composition of the present invention may contain a crosslinking assistant such as zinc oxide, a lubricant such as stearic acid, and an antioxidant, as desired, in addition to the above-mentioned components (a) and (b), crosslinkable monomer (c), inorganic filler (d) and organic peroxide (e).

Typical examples of the solid golf balls produced from the rubber compositions of the present invention by crosslinking and molding will be illustrated with reference to the drawings.

FIG. 1 is a schematic cross sectional view showing a one-piece solid golf ball. The reference numeral 1 designates a main body portion, and the reference numeral 1a designates dimples. The main body portion 1 is constituted by a rubber substance (that is to say, a rubber substance composed of a crosslinked molded article of the rubber composition of the present invention).

Figure 2:
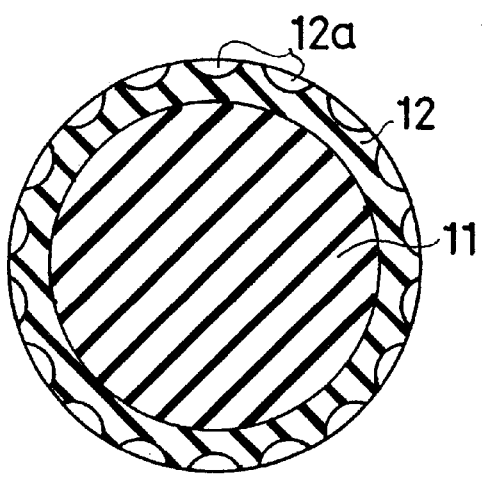
FIG. 2 is a schematic cross sectional view showing an example of two-pieces solid golf balls.

FIG. 2 is a schematic cross sectional view showing a two-pieces solid golf ball. The reference numeral 11 designates a core, and the reference numeral 12 designates a cover. The core 11 is coated with the cover 12, and the reference numeral 12a designates dimples. The core 11 is constituted by a rubber substance.

Figure 3:
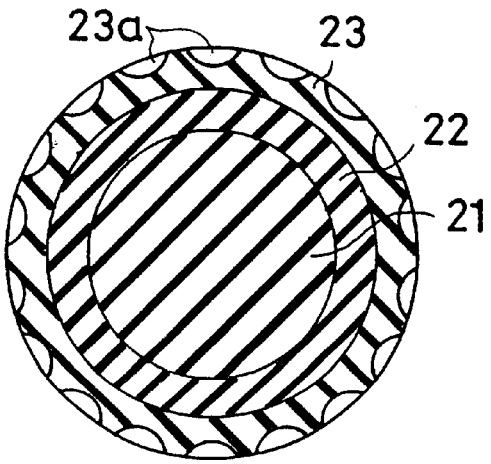
FIG. 3 is a schematic cross sectional view showing an example of three-pieces solid golf balls.

FIG. 3 is a schematic cross sectional view showing a three-pieces solid golf ball. The reference numeral 21 designates an inner core, the reference numeral 22 designates an outer core, the reference numeral 23 designates a cover, and the reference numeral 23a designates dimples. In this three-pieces solid golf ball, the inner core 21 and the outer core 22 constitute a solid core. The inner core 21 or the outer core 22, or both the inner core 21 and the outer core 22 are constituted by a rubber substance. It is preferred in terms of flight and rotation keeping properties that the density of the outer core 22 of the three-pieces solid golf ball is higher than that of the inner core 21. For example, the above can be achieved by adding a filler having a higher specific gravity such as $W_2O_5$ to the outer core 22 and a filler having a lower specific gravity such as $ZnO_2$ to the inner core 21.

Then, methods for producing the solid golf balls using the rubber compositions of the present invention will be described. First, the rubber composition of the present invention is placed in a required mold, and crosslinked and molded with a press to form each of the main body portion of the one-piece solid golf ball, the core of the two-pieces solid golf ball and the inner core of three-pieces solid golf ball. The crosslinking is preferably conducted at a temperature of 130° C. to 180° C. for 10 minutes to 50 minutes. The temperature in crosslinking and molding may be changed in two or more steps.

In the three-pieces solid golf ball, a sheet of the rubber composition for the outer layer, which is formed to a desired thickness, is adhered to the outside of the inner core obtained as described above, and crosslinked and molded with a press to form a solid core having a two-layers structure. In the three-pieces solid golf ball, either the rubber composition used for the inner core or the rubber composition used in the outer core should be the rubber composition of the present invention. However, it is preferred that both are the rubber composition of the present invention.

The covers of the two-pieces solid golf ball and the three-pieces solid golf ball are formed by coating the above-mentioned cores with cover compositions in which additives, for example, inorganic white pigments such as titanium oxide, and light stabilizers, are appropriately mixed with resin components mainly composed of ionomer resins or the like. In coating, the injection molding method is usually employed. However, the coating method is not limited thereto.

Further, desired dimples are formed as needed, in molding the main body portion for the one-piece solid golf ball, and in molding the cover for the two-pieces solid golf ball or the three-pieces solid golf ball.

A four-pieces solid golf ball can also be produced from the composition of the present invention in the same manner as with the three-pieces solid golf ball.

The solid golf balls obtained from the rubber compositions of the present invention are excellent in production workability, good in the feeling of ball hitting, long in flight and excellent in durability.

This invention will be illustrated with reference to examples in more details below, but the following disclosure shows preferred embodiments of the invention and not intended to limit the scope of the invention.

SYNTHESIS EXAMPLE 1

Modified Polybutadiene Rubber (A): Synthesis of HPB (A)

An autoclave having an inner volume of 5 liters, the inside of which was replaced with nitrogen, was charged with 2.5 kg of cyclohexane and 300 g of 1,3-butadiene under a nitrogen atmosphere. A catalyst was prepared by previously mixing a solution of neodymium octanoate (0.18 mmol) and acetylacetone (0.37 mmol) in cyclohexane, a solution of methylalumoxane (18.5 mmol) in toluene, a solution of diisobutylaluminum hydride (3.9 mmol) in cyclohexane and a solution of diethylaluminum chloride (0.370 mmol) in cyclohexane, and reacting the resulting mixture with 5-fold moles of 1,3-butadiene (0.90 mmol) in relation to neodymium octanoate and aging the resulting product at 25° C. for 30 minutes. The above prepared catalyst was added to the mixture in the autoclave, followed by polymerization at 50° C. for 30 minutes. The degree of conversion of 1,3-butadiene was approximately 100%. Then, the temperature of the polymerization solution was kept at 50° C., and 3-glycidyloxypropyltrimethoxysilane (5.40 mmol) was added thereto. Thereafter, the solution was allowed to stand for 30 minutes, and a solution of 2,4-di-t-butyl-p-cresol (1.5 g) in methanol was added. After the termination of polymerization, the solvents were removed by steam stripping, and the resulting product was dried on a roll heated at 110° C. to obtain a polymer. The 1,4-cis bond content of the obtained polymer was 97.8 mol %, the 1,2-vinyl bond content was 1.0 mol %, the Mw/Mn ratio was 2.4, the Mooney viscosity ($ML_{1+4}$ (100° C.)) was 41, and the toluene solution viscosity was 210.

SYNTHESIS EXAMPLE 2

Modified Polybutadiene Rubber (B): Synthesis of HPB (B)

A polymer was prepared in the same manner as with the synthesis example of HPB (A) with the exception that the amount of methylalumoxane added was changed to 9.2 mmol. The property values of the polymer are shown in Table 1.

SYNTHESIS EXAMPLE 3

Modified Polybutadiene Rubber (C): Synthesis of HPB (C)

A polymer was prepared in the same manner as with the synthesis example of HPB (A) with the exception that the amount of methylalumoxane added was changed to 9.2 mmol, and the amount of diisobutylaluminum hydride added was changed to 4.5 mmol. The property values of the polymer are shown in Table 1.

SYNTHESIS EXAMPLE 4

Modified Polybutadiene Rubber (D): Synthesis of HPB (D)

A polymer was prepared in the same manner as with the synthesis example of HPB (A) with the exception that the amount of methylalumoxane added was changed to 9.2 mmol, and the amount of diisobutylaluminum hydride added was changed to 3.2 mmol. The property values of the polymer are shown in Table 1.

SYNTHESIS EXAMPLE 5

Modified Polybutadiene Rubber (E): Synthesis of HPB (E)

A polymer was prepared in the same manner as with the synthesis example of HPB (A) with the exception that the amount of methylalumoxane added was changed to 9.2 mmol, and the amount of diisobutylaluminum hydride added was changed to 5.0 mmol. The property values of the polymer are shown in Table 1.

SYNTHESIS EXAMPLE 6

Modified Polybutadiene Rubber (F): Synthesis of HPB (F)

A polymer was prepared in the same manner as with the synthesis example of HPB (A) with the exception that the amount of methylalumoxane added was changed to 9.2 mmol, and the amount of diisobutylaluminum hydride added was changed to 1.6 mmol. The property values of the polymer are shown in Table 1.

SYNTHESIS EXAMPLE 7

Modified Polybutadiene Rubber (G): Synthesis of HPB (G)

A polymer was prepared in the same manner as with the synthesis example of HPB (A) with the exception that the amount of methylalumoxane added was changed to 5.1 mmol. The property values of the polymer are shown in Table 1.

SYNTHESIS EXAMPLE 8

Modified Polybutadiene Rubber (H): Synthesis of HPB (H)

A polymer was prepared in the same manner as with the synthesis example of HPB (A) with the exception that the amount of methylalumoxane added was changed to 9.2 mmol, and the modifier was changed to polymeric type diphenylmethane diisocyanate (5.4 mmol). The property values of the polymer are shown in Table 1.

HPB (H) is modified polybutadiene rubber for comparison using the modifier (polymeric type diphenylmethane diisocyanate) described in Japanese Patent Laid-open Publication (Hei) 11-164912. BR01, BR03, BR11 and BR18 in Table 1 are unmodified polybutadiene rubber using no modifier.

As to the solution viscosity (SV) in Table 1, the viscosity of a 5-wt % solution of a previously prepared polymer in toluene was measured with a Cannon-Fenske viscometer in a thermostat at 25° C.

TABLE 1

| Synthesis Example | 1 | 2 | 3 | 4 | 5 | 6 | 7 | 8 | | | | |
|---|---|---|---|---|---|---|---|---|---|---|---|---|
| Polybutadiene | HPB (A) | HPB (B) | HPB (C) | HPB (D) | HPB (E) | HPB (F) | HPB (G) | HPB (H) | BR01 | BR03 | BR11 | BR18 |
| Polymerization Conditions | | | | | | | | | | | | |
| Polymerization Cat. | Nd | Nd | Nd | Nd | Nd | Nd | Nd | Nd | Ni | Ni | Ni | Ni |
| Modifier | Si | Si | Si | Si | Si | Si | Si | MDI | Unmodified | Unmodified | Unmodified | Unmodified |
| Properties | | | | | | | | | | | | |
| Mooney Viscosity | 41 | 40 | 35 | 56 | 28 | 105 | 43 | 44 | 45 | 34 | 43 | 59 |
| 1,4-Cis Content | 97.8 | 98.1 | 97.6 | 98.3 | 98.1 | 98.5 | 97.6 | 97.5 | 95 | 94.5 | 96 | 96 |
| 1,2-Vinyl Content | 1 | 1.1 | 1.2 | 1 | 1 | 1.1 | 1.1 | 1.1 | 2.5 | 2.5 | 2.5 | 2.0 |
| Solution Viscosity (SV) | 210 | 295 | 165 | 390 | 115 | 1120 | 360 | 330 | 150 | 75 | 270 | 590 |
| Mw/Mn | 2.4 | 3.2 | 2.9 | 3.1 | 3.1 | 2.9 | 4.1 | 3.1 | 4.0 | 2.4 | 4.3 | 4.4 |

BR01: Polybutadiene rubber manufactured by JSR Corporation
BR03: Polybutadiene rubber manufactured by JSR Corporation
BR11: Polybutadiene rubber manufactured by JSR Corporation
BR18: Polybutadiene rubber manufactured by JSR Corporation
Si: 3-Glycidyloxypropyltrimethoxysilane
MDI: Polymeric type diphenylmethane diisocyanate

EXAMPLES 1 TO 6 AND COMPARATIVE EXAMPLES 1 TO 4

According to a formulation described in Table 2 shown below, polybutadiene shown in Table 1, zinc diacrylate, zinc oxide, dicumyl peroxide and the antioxidant were kneaded with rolls, and the resulting rubber composition was crosslinked and molded under pressure at 150° C. for 30 minutes to obtain a core having a diameter of 38.5 mm. For comparing production workability, the wrapping test was carried out using 6-inch rolls to evaluate roll processability.

Conditions of the wrapping test; temperature: 70° C., nip width: 1.4 mm, revolutions: 20 rpm/24 rpm Here, the roll processability was evaluated as follows. The larger numerical value indicates the better roll processability (the same applies in Tables 3 and 4).

5: The rubber composition finely wraps around the roll, and a surface thereof is smooth.
4: The rubber composition wraps around the roll, and a surface thereof does not feel rough.
3: The rubber composition wraps around the roll, but a surface thereof feels rough.
2: The rubber composition wraps around the roll, but one or more holes are formed on a surface thereof to cause a poor appearance.
1: The rubber composition does not wrap around the roll.

Results shown in Table 2 reveal that Examples 1 to 6 are superior to Comparative Examples 1 to 4 in roll processability.

Then, the resulting core was coated by the injection molding method with a cover composition composed of a mixture of 100 parts by weight of an ionomer resin (trade name: Surlyn, manufactured by du Pont) and 2 parts by weight of titanium dioxide to form a cover, thereby preparing a two-pieces solid golf ball having an outer diameter of 42.7 mm. In Comparative Examples 2 and 3, the modifier (polymeric type diphenylmethane diisocyanate) described in Japanese Patent Laid-open Publication (Hei) 11-164912 was used. The ball obtained in Comparative Example 4 is a conventional standard two-pieces solid golf ball.

As to the two-pieces solid golf balls thus obtained, their weight, compression (PGA indication), initial velocity, flight and hammering durability were measured. Results thereof are shown in Table 2. Further, ten top professional golf players actually hit the resulting solid golf balls with a wood No. 1 club to examine their feeling of ball hitting. Results thereof are also shown in Table 2.

Methods for measuring the above-mentioned initial velocity, flight and hammering durability and a method for evaluating the feeling of ball hitting are as follows.

(1) Initial Velocity: A ball was hit at a head speed of 45 m/second with a wood No. 1 club attached to a swing robot manufactured by True Temper Co., and the initial velocity (m/second) of the ball at that time was measured.

(2) Flight (carry): When a ball was hit at a head speed of 45 m/second with a wood No. 1 club attached to a swing robot manufactured by True Temper Co., Ltd., the distance (yard) to a position on which the ball fell was measured.

(3) Hammering Durability: A ball was repeatedly collided against a collision plate at a speed of 45 m/second, and the number of collisions required until the ball was broken was examined. The hammering durability was indicated by the index taking as 100 the number of collisions required until the ball of Comparative Example 4 was broken.

(4) Feeling of Ball Hitting: The feeling of ball hitting was evaluated by an actual hitting test by ten top professional golf players. In the evaluation of the feeling of ball hitting, the feeling of ball hitting was compared with that of the ball of Comparative Example 4, a conventional standard two-pieces solid golf ball. Criteria for the evaluation are as follows and are indicated by the same symbols when they are shown in Table 2 to 4 as results of the evaluation. In this case, it indicates that 8 players of the ten players made the same evaluation.

Criteria for Evaluation:

○: The feeling of ball hitting is softer and better than that of the ball of Comparative Example 4.

Δ: The feeling of ball hitting is equivalent to that of the ball of Comparative Example 4.

×: The feeling of ball hitting is harder and worse than that of the ball of Comparative Example 4.

From the results shown in Table 2, the balls of Examples 1 to 6 showed long flight (carry) and were excellent in durability, compared with the balls of Comparative Examples 1 to 3, and moreover, good in the feeling of ball hitting, compared with the ball of Comparative Example 4, a conventional standard two-pieces solid golf ball.

TABLE 2

| Compounding Ratio (parts by weight) | Example | | | | | | Comparative Example | | | |
|---|---|---|---|---|---|---|---|---|---|---|
| | 1 | 2 | 3 | 4 | 5 | 6 | 1 | 2 | 3 | 4 |
| Polybutadiene | | | | | | | | | | |
| HPB (A) | 100 | 60 | — | — | — | — | 30 | — | — | — |
| HPB (B) | — | — | 100 | 60 | — | — | — | — | — | — |
| HPB (G) | — | — | — | — | 100 | 60 | — | — | — | — |
| HPB (H) | — | — | — | — | — | — | — | 100 | 60 | — |
| BR11 | — | 40 | — | 40 | — | 40 | 70 | — | 40 | 100 |
| Zinc Diacrylate | 25 | 25 | 25 | 25 | 25 | 25 | 25 | 25 | 25 | 25 |
| Zinc Oxide | 22 | 22 | 22 | 22 | 22 | 22 | 22 | 22 | 22 | 22 |
| Dicumyl Peroxide | 1.8 | 1.8 | 1.8 | 1.8 | 1.8 | 1.8 | 1.8 | 1.8 | 1.8 | 1.8 |
| Antioxidant* | 0.5 | 0.5 | 0.5 | 0.5 | 0.5 | 0.5 | 0.5 | 0.5 | 0.5 | 0.5 |
| Roll Processability | 5 | 5 | 5 | 5 | 5 | 5 | 4 | 3 | 4 | 4 |
| Weight (g) | 45.5 | 45.4 | 45.5 | 45.5 | 45.4 | 45.4 | 45.4 | 45.5 | 45.5 | 45.4 |
| Compression (PGA) | 91 | 90 | 91 | 90 | 90 | 89 | 90 | 90 | 91 | 90 |
| Initial Velocity (m/sec) | 69.5 | 68.9 | 69.3 | 68.4 | 67.3 | 66.9 | 64.8 | 66.5 | 66.3 | 63.5 |
| Flight (yard) | 241 | 239 | 239 | 238 | 236 | 234 | 228 | 234 | 231 | 222 |

TABLE 2-continued

| Compounding Ratio (parts by weight) | Example | | | | | | Comparative Example | | | |
|---|---|---|---|---|---|---|---|---|---|---|
| | 1 | 2 | 3 | 4 | 5 | 6 | 1 | 2 | 3 | 4 |
| Hammering Durability** | 156 | 151 | 158 | 153 | 147 | 144 | 119 | 139 | 138 | 100 |
| Feeling of Ball Hitting | ○ | ○ | ○ | ○ | ○ | ○ | ○ | ○ | ○ | — |

*Antioxidant: Yoshinox 425 ™, manufactured by YOSHITOMI PHARMACEUTICAL INDUSTRIES, LTD
**The index taking Comparative Example 4 as 100 (the larger numerical value is better.)

EXAMPLES 7 TO 12 AND COMPARATIVE EXAMPLES 5 TO 8

Compounding materials of each formulation shown in Table 3 were kneaded with a kneader and rolls to prepare a rubber composition. The prepared rubber composition was charged into a mold, and crosslinked and molded under pressure at 168° C. for 25 minutes to prepare a one-piece solid golf ball having an outer diameter of 42.7 mm, which was formed of a crosslinked molded article integrally molded. In Comparative Examples 6 and 7, the modifier (polymeric type diphenylmethane diisocyanate) described in Japanese Patent Laid-open Publication (Hei) 11-164912 was used. The ball obtained in Comparative Example 8 is a conventional standard two-pieces solid golf ball.

Results shown Table 3 indicate that the roll processability of Examples 7 to 12 is excellent, compared with that of Comparative Examples 5 to 8.

As to the one-piece solid golf balls thus obtained, their weight, compression (PGA indication), initial velocity, flight (carry) and hammering durability were measured, and the feeling of ball hitting was evaluated, in the same manner as with Example 1. Results thereof are shown in Table 3. In the evaluation of the feeling of ball hitting, the feeling of ball hitting was compared with that of the ball of Comparative Example 8, a conventional standard one-piece solid golf ball.

As apparent from the results shown in Table 3, the balls of Examples 7 to 12 showed long flight and were excellent in durability, compared with the balls of Comparative Examples 5 to 7, and moreover, good in the feeling of ball hitting, compared with the ball of Comparative Example 8, a conventional standard one-piece solid golf ball.

TABLE 3

| Compounding Ratio (parts by weight) | Example | | | | | | Comparative Example | | | |
|---|---|---|---|---|---|---|---|---|---|---|
| | 7 | 8 | 9 | 10 | 11 | 12 | 5 | 6 | 7 | 8 |
| Polybutadiene | | | | | | | | | | |
| HPB (A) | 100 | 60 | — | — | — | — | 30 | — | — | — |
| HPB (B) | — | — | 100 | 60 | — | — | — | — | — | — |
| HPB (G) | — | — | — | — | 100 | 60 | — | — | — | — |
| HPB (H) | — | — | — | — | — | — | — | 100 | 60 | — |
| BR11 | — | 40 | — | 40 | — | 40 | 70 | — | 40 | 100 |
| Zinc Diacrylate | 23 | 23 | 23 | 23 | 23 | 23 | 23 | 23 | 23 | 23 |
| Zinc Oxide | 25 | 25 | 25 | 25 | 25 | 25 | 25 | 25 | 25 | 25 |
| Dicumyl Peroxide | 0.6 | 0.6 | 0.6 | 0.6 | 0.6 | 0.6 | 0.6 | 0.6 | 0.6 | 0.6 |
| Antioxidant* | 0.5 | 0.5 | 0.5 | 0.5 | 0.5 | 0.5 | 0.5 | 0.5 | 0.5 | 0.5 |
| Roll Processability | 5 | 5 | 5 | 5 | 5 | 5 | 4 | 4 | 4 | 4 |
| Weight (g) | 45.4 | 45.4 | 45.5 | 45.4 | 45.4 | 45.4 | 45.4 | 45.4 | 45.5 | 45.4 |
| Compression (PGA) | 81 | 80 | 81 | 81 | 80 | 80 | 80 | 81 | 80 | 80 |
| Initial Velocity (m/sec) | 64.1 | 63.9 | 64 | 63.9 | 63.3 | 62.8 | 60.7 | 62.3 | 62.1 | 60 |
| Flight (yard) | 226 | 225 | 225 | 224 | 220 | 219 | 213 | 218 | 217 | 211 |
| Hammering Durability** | 157 | 156 | 156 | 155 | 148 | 145 | 119 | 144 | 141 | 100 |
| Feeling of Ball Hitting | ○ | ○ | ○ | ○ | ○ | ○ | ○ | ○ | ○ | — |

*Antioxidant: Yoshinox 425 ™, manufactured by YOSHITOMI PHARMACEUTICAL INDUSTRIES, LTD
**The index taking Comparative Example 4 as 100 (the larger numerical value is better.)

EXAMPLES 13 TO 16 AND COMPARATIVE EXAMPLES 9 TO 11

Compounding materials of each formulation shown in Table 4 were kneaded with a kneader and rolls to prepare a rubber composition. The prepared rubber composition was crosslinked and molded under pressure at 150° C. for 30 minutes to obtain a core having a diameter of 38.5 mm. Then, the resulting core was coated by the injection molding method with a cover composition composed of a mixture of 100 parts by weight of an ionomer resin (trade name: Surlyn, manufactured by du Pont) and 2 parts by weight of titanium dioxide to form a cover, thereby preparing a two-pieces solid golf ball having an outer diameter of 42.7 mm.

As to the two-pieces solid golf balls thus obtained, their weight, compression (PGA indication), initial velocity, flight (carry) and hammering durability were measured, and the feeling of ball hitting was evaluated, in the same manner as with Example 1. Results thereof are shown in Table 4. In the evaluation of the feeling of ball hitting, the feeling of ball hitting was compared with that of the ball of Comparative Example 4, a conventional standard one-piece solid golf ball.

As apparent from the results shown in Table 4, also in these two-pieces solid golf balls, the solid golf balls of Examples 13 to 16 showed long flight and were excellent in durability, compared with the solid golf balls of Comparative Examples 4 and 9 to 11, and moreover, good in the feeling of ball hitting, compared with the solid golf ball of Comparative Example 4, a conventional standard two-pieces solid golf ball.

TABLE 4

| Compounding Ratio (parts by weight) | Example | | | | | Comparative Example | | | |
|---|---|---|---|---|---|---|---|---|---|
| | 3 | 13 | 14 | 15 | 16 | 4 | 9 | 10 | 11 |
| Polybutadiene | | | | | | | | | |
| HPB (B) | 100 | — | — | — | — | — | — | — | — |
| HPB (C) | — | 100 | — | — | — | — | — | — | — |
| HPB (D) | — | — | 100 | — | — | — | — | — | — |
| HPB (E) | — | — | — | 100 | — | — | — | — | — |
| HPB (F) | — | — | — | — | 100 | — | — | — | — |
| BR11 | — | — | — | — | — | 100 | — | — | — |
| BR01 | — | — | — | — | — | — | 100 | — | — |
| BR03 | — | — | — | — | — | — | — | 100 | — |
| BR18 | — | — | — | — | — | — | — | — | 100 |
| Zinc Diacrylate | 25 | 25 | 25 | 25 | 25 | 25 | 25 | 25 | 25 |
| Zinc Oxide | 22 | 22 | 22 | 22 | 22 | 22 | 22 | 22 | 22 |
| Dicumyl Peroxide | 1.8 | 1.8 | 1.8 | 1.8 | 1.8 | 1.8 | 1.8 | 1.8 | 1.8 |
| Antioxidant* | 0.5 | 0.5 | 0.5 | 0.5 | 0.5 | 0.5 | 0.5 | 0.5 | 0.5 |
| Roll Processability | 5 | 5 | 4 | 5 | 4 | 4 | 3 | 3 | 3 |
| Weight (g) | 45.5 | 45.4 | 45.5 | 45.5 | 45.5 | 45.4 | 45.4 | 45.4 | 45.4 |
| Compression (PGA) | 91 | 90 | 91 | 90 | 90 | 90 | 91 | 90 | 90 |
| Initial Velocity (m/sec) | 69.3 | 67.4 | 71.8 | 66.9 | 66.7 | 63.5 | 61.9 | 61.3 | 68.7 |
| Flight (yard) | 239 | 237 | 247 | 235 | 236 | 222 | 211 | 206 | 235 |
| Hammering Durability** | 158 | 144 | 165 | 142 | 141 | 100 | 99 | 93 | 131 |
| Feeling of Ball Hitting | ◯ | ◯ | ◯ | ◯ | ◯ | — | Δ | Δ | Δ |

*Antioxidant: Yoshinox 425 ™, manufactured by YOSHITOMI PHARMACEUTICAL INDUSTRIES, LTD
**The index taking Comparative Example 4 as 100 (the larger numerical value is better.)

What is claimed is:

1. A rubber composition containing (a) 50 parts to 100 parts by weight of polybutadiene rubber having a 1,4-cis bond content of 80 mol % to 100 mol % and a 1,2-vinyl bond content of 0 mol % to 2 mol %, which is modified with an alkoxysilyl group-containing compound, (b) 0 part to 50 parts by weight of diene rubber other than the above-mentioned component (a) (wherein the total amount of component (a) and component (b) is 100 parts by weight), (c) 10 parts to 50 parts by weight of a crosslinkable monomer, (d) 5 parts to 80 parts by weight of an inorganic filler and (e) 0.1 part to 10 parts by weight of an organic peroxide.

2. The rubber composition according to claim 1, wherein modified polybutadiene rubber (a) has a ratio (Mw/Mn) of weight average molecular weight (Mw) to number average molecular weight (Mn) of 1.0 to 3.5.

3. The rubber composition according to claim 2, wherein modified polybutadiene rubber (a) has a Mooney viscosity (ML$_{1+4}$ (100° C.)) of 30 to 100.

4. The rubber composition according to claim 3, wherein component (a) is modified polybutadiene rubber obtained by polymerizing butadiene using a rare earth element catalyst, and subsequently allowing the alkoxysilyl group-containing compound to react with the resulting polybutadiene.

5. The rubber composition according to claim 4, wherein the rare earth element catalyst is a neodymium catalyst.

6. The rubber composition according to claim 2, wherein component (a) is modified polybutadiene rubber obtained by polymerizing butadiene using a rare earth element catalyst, and subsequently allowing the alkoxysilyl group-containing compound to react with the resulting polybutadiene.

7. The rubber composition according to claim 6, wherein the rare earth element catalyst is a neodymium catalyst.

8. The rubber composition according to claim 2, wherein the alkoxysilyl group-containing compound is an alkoxysilane compound having at least one epoxy group or isocyanate group in a molecule thereof.

9. The rubber composition according to claims 8, wherein the alkoxysilyl group-containing compound is 3-glycidyloxypropyltrimethoxysilane.

10. The rubber composition according to claim 1, wherein modified polybutadiene rubber (a) has a Mooney viscosity (ML$_{1+4}$ (100° C.)) of 30 to 100.

11. The rubber composition according to claim 10, wherein component (a) is modified polybutadiene rubber obtained by polymerizing butadiene using a rare earth element catalyst, and subsequently allowing the alkoxysilyl group-containing compound to react with the resulting polybutadiene.

12. The rubber composition according to claim 11, wherein the rare earth element catalyst is a neodymium catalyst.

13. The rubber composition according to claim 10, wherein the alkoxysilyl group-containing compound is an alkoxysilane compound having at least one epoxy group or isocyanate group in a molecule thereof.

14. The rubber composition according to claim 1, wherein component (a) is modified polybutadiene rubber obtained by polymerizing butadiene using a rare earth element catalyst, and subsequently allowing the alkoxysilyl group-containing compound to react with the resulting polybutadiene.

15. The rubber composition according to claim 14, wherein the rare earth element catalyst is a neodymium catalyst.

16. The rubber composition according to claim 14, wherein the alkoxysilyl group-containing compound is an alkoxysilane compound having at least one epoxy group or isocyanate group in a molecule thereof.

17. The rubber composition according to claim 15, wherein the alkoxysilyl group-containing compound is an alkoxysilane compound having at least one epoxy group or isocyanate group in a molecule thereof.

18. The rubber composition according to claim 1, wherein the alkoxysilyl group-containing compound is an alkoxysilane compound having at least one epoxy group or isocyanate group in a molecule thereof.

19. The rubber composition according to claims 18, wherein the alkoxysilyl group-containing compound is 3-glycidyloxypropyltrimethoxysilane.

20. A solid golf ball in which a part or the whole of a rubber substance constituting the solid golf ball is obtained by crosslinking and molding the rubber composition according to any one of claims 1 to 9.

* * * * *